(12) United States Patent
Basson et al.

(10) Patent No.: US 7,805,224 B2
(45) Date of Patent: *Sep. 28, 2010

(54) MEDICAL APPLICATIONS IN TELEMATICS

(75) Inventors: Sara H. Basson, White Plains, NY (US);
Peter G. Fairweather, Yorktown Heights, NY (US); Dimitri Kanevsky, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 607 days.

This patent is subject to a terminal disclaimer.

(21) Appl. No.: 11/760,269

(22) Filed: Jun. 8, 2007

(65) Prior Publication Data

US 2007/0241915 A1 Oct. 18, 2007

Related U.S. Application Data

(63) Continuation of application No. 10/744,299, filed on Dec. 22, 2003, now Pat. No. 7,266,430.

(51) Int. Cl.
*G05D 1/00* (2006.01)

(52) U.S. Cl. .............................. 701/1; 701/36; 701/45; 701/63; 704/200; 340/438; 340/439

(58) Field of Classification Search ..................... 701/1, 701/29, 33, 35, 36, 45, 63; 340/425.5, 438, 340/439; 381/FOR. 110; 704/200, 246
See application file for complete search history.

(56) References Cited

U.S. PATENT DOCUMENTS

| 3,947,815 | A | 3/1976 | Muncheryan |
| 4,706,072 | A | 11/1987 | Ikeyama |
| 5,195,606 | A | 3/1993 | Martyniuk |
| 5,775,456 | A | 7/1998 | Reppas et al. |
| 5,942,979 | A | 8/1999 | Luppino |
| 6,285,923 | B1 | 9/2001 | Matsuda et al. |
| 7,266,430 | B2 * | 9/2007 | Basson et al. ................. 701/1 |

* cited by examiner

*Primary Examiner*—Gertrude Arthur Jeanglaud
(74) *Attorney, Agent, or Firm*—Jeanine S. Ray-Yarletts, Esq.; Steven M. Greenberg, Esq.; Carey, Rodriguez, Greenberg & Paul, LLP

(57) ABSTRACT

A vehicle control system and method for facilitating operation of a vehicle by a driver with a potentially debilitating condition. At least one sensor provides sensor data corresponding to at least one of a vehicle condition or a driver condition. A database includes potentially debilitating condition data and symptoms data corresponding thereto. A central processing unit is in data communication with the database and the at least one sensor. The central processing monitors the operation of the vehicle by the driver based on the sensor data and the database.

14 Claims, 6 Drawing Sheets

MEDICAL APPLICATIONS IN TELEMATICS

BACKGROUND OF THE INVENTION

1. Statement of the Technical Field

The present invention relates to the field of human factors engineering and more particularly to a performance monitoring and feedback system using telematics.

2. Description of the Related Art

A large number of individuals have physical or mental conditions that can compromise their ability to operate vehicles such as heavy equipment, cars, trucks, motorcycles, etc. These conditions can impair performance in a predictable, recurring manner or it can do so unpredictably. Although a condition can be chronic in nature such as Attention Deficit Disorder, Alzheimer's Disease, and Diabetes, it can also be temporary such as Influenza, fatigue, or other debilitation. Although certain conditions can make it illegal to drive a car, for example, it is still legal (even if unadvisable) to drive with potentially debilitating conditions.

The risk posed to other drivers by those with potentially debilitating conditions is enormous. However unadvisable operating a motor vehicle may be for those with debilitating conditions, it is simply not practical to refuse all persons with potentially debilitating conditions the privilege of operating a motor vehicle. It is therefore desirable to have a system and method which monitors the driver's ability to operate the vehicle and can assist the driver to take corrective action when unsafe or potentially unsafe vehicle operation is detected.

Often, those with debilitating conditions exhibit symptoms of the condition prior to or during an episode. For example, persons with Alzheimer's Disease may forget what certain road signs mean, while persons with Attention Deficit Disorder may forget the directions to their destination. It is desirable to have a system and method which is able to detect the manifestation of symptoms of the debilitating condition and assist the driver with the operation of the vehicle.

Some drivers use implanted devices such as pace makers. These devices can include sensors for detecting life threatening situations for the patient drivers. Such situations could be detection of a heart attack for prior heart attack victims, loss of control due to medical conditions such as diabetes, epilepsy, etc. These conditions present a serious risk for driving. It is desirable to have a method and system which makes use of the telemetry data provided by the implanted sensors to minimize if not eliminate the hazardous driving conditions which can result from occurrence of a life threatening medical situation.

SUMMARY OF THE INVENTION

The present invention addresses the deficiencies of the art in respect to safe vehicle operation in the presence of drivers having potentially debilitating conditions and provides a novel and non-obvious method and system which uses telematics in a medical application for a vehicle control system.

Methods consistent with the present invention provide a method for facilitating operation of a vehicle by a driver with a potentiality debilitating condition in which data is received data from a sensor. The sensor monitors at least one of a vehicle condition and a driver condition. Potentially debilitating condition data and symptoms data corresponding thereto is stored in a database. The operation of the vehicle by the driver is monitored based on the sensor data, the debilitating condition data and the symptoms data.

Systems consistent with the present invention include a vehicle control system for facilitating operation of a vehicle by a driver with a potentially debilitating condition in which at least one sensor provides sensor data for at least one of a vehicle condition or a driver condition. A database includes potentially debilitating condition data and symptoms data corresponding thereto. A central processing unit is in data communication with the database and the at least one sensor, the central processing unit monitoring the operation of the vehicle by the driver based on the sensor data and the database.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings which are incorporated in and constitute part of the specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

Figure 1:
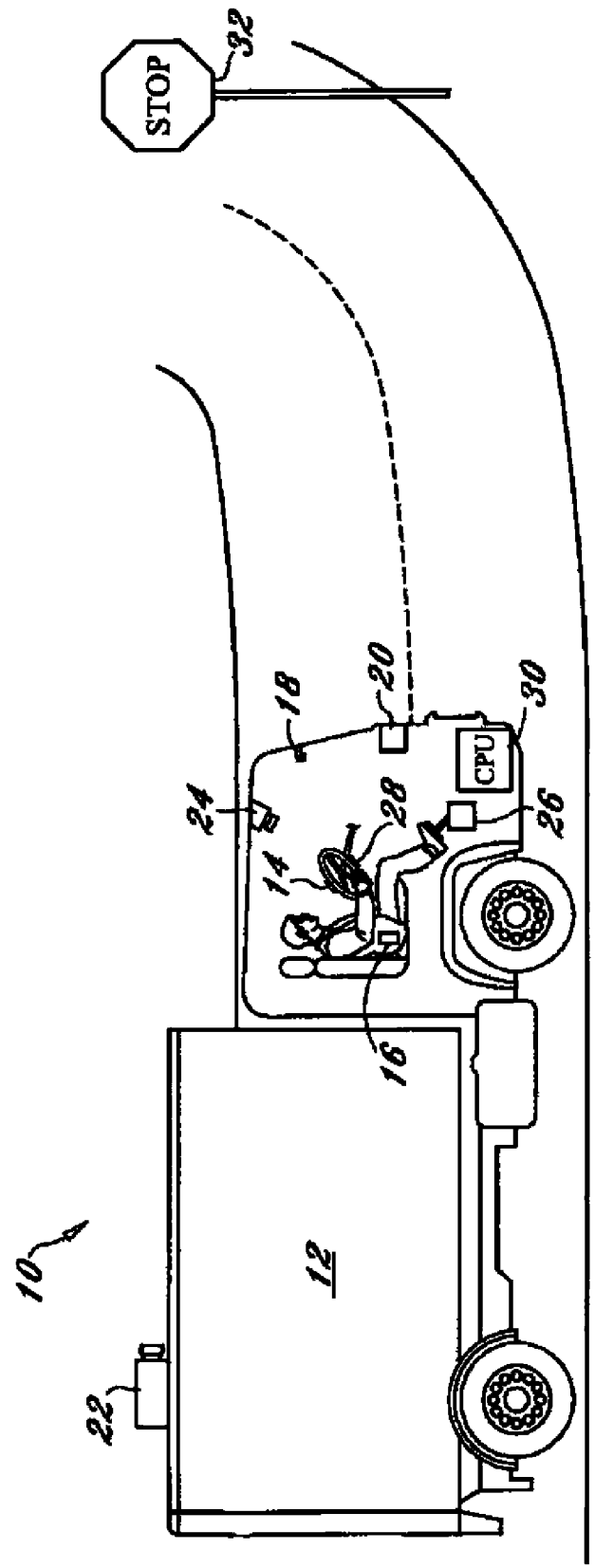
FIG. 1 is a diagram of a vehicle control system constructed in accordance with the principles of the present invention.

The present invention is a method and system which uses telemetric data to monitor a vehicle operator's condition and driving performance in order to assist the driver with the safe operation of the vehicle. Referring now to the drawing figures in which like reference designators refer to like elements, there is shown in FIG. 1 a diagram of a vehicle control system constructed in accordance with the principles of the present invention and designated generally as "10".

System 10 includes vehicle 12, steering wheel sensor 14, body bio-sensor 16, microphone 18, speaker 20, cameras 22 and 24, pedal tremor normalizer 26, wheel tremor normalizer 28 and CPU 30. Each of devices 14-28 are directly or indirectly coupled to and controlled by CPU 30. CPU 30 can be any computer having the capacity and capabilities to control system 10 and perform the functions described herein.

Steering wheel sensor 14 is placed on or near the vehicle's steering wheel and measures steering wheel response, in other words whether the driver is turning the wheel in a quick and aggressive manner or in a lethargic and slow manner. Body biosensor 16 is placed on or around the driver's body and measures the scent of a person breath, glucose level in the blood, or any other biometric parameter used in conjunction with the operation of vehicle control system 10. Biometric sensors for measuring various biometric parameters are known.

Microphone 18 is used to input the voice of the driver for analysis by CPU 30. Speaker 20 outputs the voice of an artificial computer-derived person ("AP"). Camera 22 observes the exterior of the vehicle and is used to provide input to CPU 30. Camera 24 observes the vehicle operator to aid determination of the debilitating condition symptom onset.

Pedal tremor normalizer 26 is coupled to the accelerator pedal vehicle operation input device of vehicle 12 and includes a sensor that can pickup sudden and rapidly repeating movements by the operator due to nervousness, medical condition, etc. Wheel tremor normalizer 28 is coupled to the steering wheel vehicle operation input device sensor 14 and, like pedal tremor normalizer 26, picks up sudden and rapidly repeating movements. The operation of normalizers 26 and 28 are discussed below in detail.

Although not shown in FIG. 1, it is contemplated that vehicle control system 10 can operate in conjunction with a global positioning system ("GPS") operating with or separately from camera 22 to notify the vehicle operator that they are approaching a intersection, designated point along a route to a destination, or a traffic signal such as stop sign 32. In operation, vehicle control system 10 also includes the ability to identify the operator of the vehicle. This can be accomplished, for example by voice recognition using microphone 18, visual identification by using camera 24, a combination of the two or a separate biometric sensor (not shown) in conjunction with CPU 30.

Figure 2:
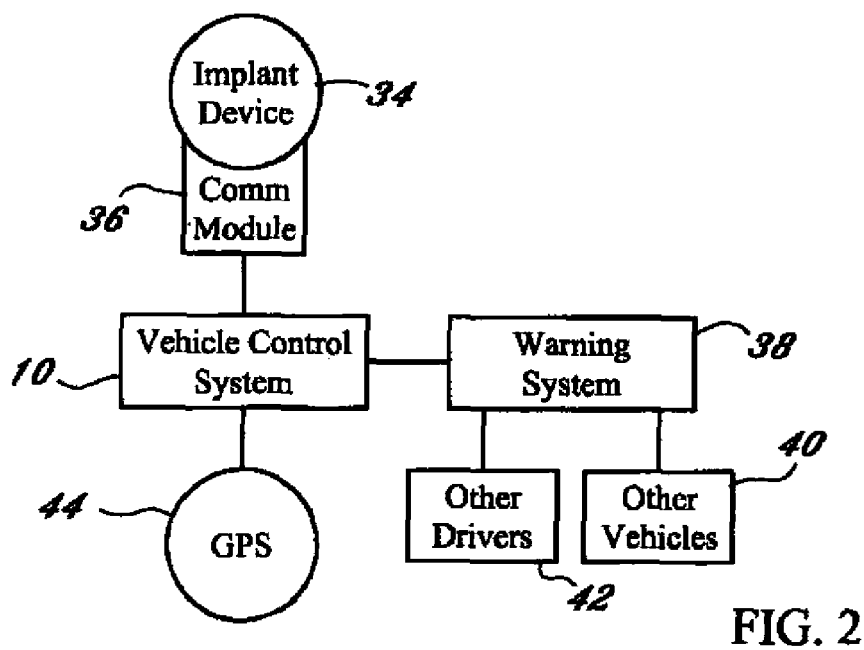
FIG. 2 is a block diagram showing the interoperation between a vehicle control system, implanted devices and a warning system.

In addition to the external sensors shown and described with reference to FIG. 1, vehicle control system 10 can also make use of data from devices implanted within the driver. An example is described with reference to FIG. 2. FIG. 2 is a block diagram showing the interoperation between vehicle control system 10, implanted devices and a feature of the present invention which allows vehicle control system 10 to alert other drivers or other vehicles of the existence of a condition which may impair the vehicle operator's ability to control the vehicle. As shown in FIG. 2, vehicle control system 10 communicates with implant device 34 via communication module 36. Implant device 34 can be any device implanted in the vehicle operator, such as pace maker, biometric sensor, etc. Communication module 36 facilitates communication between the implant device 34 and vehicle control system 10. Implant device 34 includes a sensor (not shown) providing sensor data used to detect a crisis situation, such as a heart attack, possibility of heart attack, epileptic event, and the like. Upon detection of such a condition, vehicle control system 10 interacts with warning system 38 to alert other vehicles 40 and/or other drivers 42 of the existence of the crisis situation. As such, sensor data can be derived from one or more of the vehicle sensors providing information about the condition of the vehicle and its components and sensor data can be derived from biometric sensors and/or implanted devices providing information about the condition of the driver.

The vehicle control system 10 can operate with GPS 44 and camera 22 to determine what other drivers or other vehicles are in the general proximity of vehicle 12 as well as determining the speed of the other vehicles to alert other vehicles or drivers and/or to safely bring vehicle 12 to a stop. Of note, although vehicle control system 10 and warning system 38 are shown as separate elements, it is contemplated that warning system 38 can be provided as part of vehicle control system 10 or can be a separate system. As a separate system, warning system 38 can be implemented in conjunction with a roadway data system ("RDS") or provided by governmental or emergency agencies. In operation, warning system 38 receives indications from vehicle control system 10 as to the onset or existence of a crisis within vehicle 12 and generates appropriate wired and/or wireless communication signals to alert drivers 42 and/or other vehicles 40.

Figure 3:
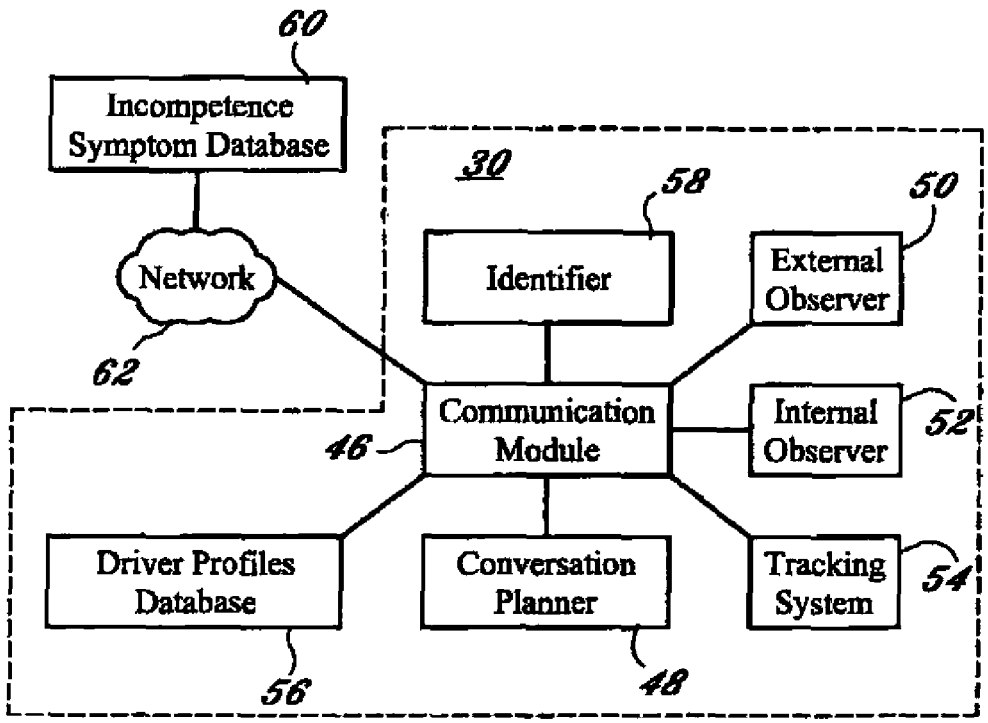
FIG. 3 is a block diagram of the functions performed by a central processing unit constructed in accordance with the principles of the present invention.

Functions performed by CPU 30 via its hardware, software, storage devices, and the like are explained with reference to FIG. 3. CPU 30 provides an application that runs the artificial person. CPU 30 includes communication module 46, conversation planner 48, external observer 50, internal observer 52, tracking system 54, driver profiles database 56 and identifier 58. Communication module 46 can also communicate with incompetence system database 60 via network 62. Incompetence system database 60 can also be provided as part of CPU 30. However, it is contemplated that incompetence system database 60 may be so large as to be impractical to be included within vehicle 12 as part of the physical componentry of CPU 33 and may therefore need to be accessed via a wireless communication network such as network 62. Incompetence system database 60 includes a list of symptoms and their corresponding conditions so that CPU 33 can, knowing a particular driver's condition, observe for the occurrence of corresponding symptoms.

Communication module 46 communicates with the various sensors, microphones and cameras included as part of system 10, as well as provides the interface with the components comprising the artificial person.

External observer 50 receives and analyzes information from outside of vehicle 12 such as road signs, traffic lights, road conditions, the proximity of other vehicles, and weather conditions. Systems for monitoring external vehicle conditions are known. Internal observer 52 observes the driver and monitors and processes the driver's behavior. For example, internal observer 52 functions to determine whether the driver is falling asleep, appears intoxicated, observes indications of diabetic reactions, confusion, etc. It is contemplated that internal observer 52 includes face recognition technology for determining the emotions of the driver as well as the ability to identify a driver.

Conversational planner 48 is used to engage in conversation with the driver and evaluate the condition of the driver. For example, conversational planner 48 can be used to determine whether the driver is experiencing symptoms of depression or whether the driver is paying attention to the road. As such, the conversational planner 48 may ask the driver about his or her opinion on a movie or a family situation. If the driver responds negatively or the response is determined to be an incompetence symptom that indicates a person is experiencing depression, conversational planner 48, via speaker 20 will maintain a pleasant and relaxed dialogue with the driver, ultimately operating with the other elements of system 10 to conduct further competency analysis while giving directions and gentle reminders to stay focused and make correct turns on the appropriate roads based on the driver's destination. It is further contemplated that conversational planner 48 may initiate the playback of a joke through speaker 20 regarding a driver's to turn on a particular road as a way to gently prompt the driver to remember on his or her own to turn on the correct street. Conversational planner 48 may also be use to transmit information and ask questions of the driver. For example, conversation planner 48 may ask the driver had taken his or her medication.

Tracking system 54 works in conjunction with sensor, camera, and microphone data to recognize special situations such as fatigue, drowsiness, hyperactivity, and the like. Tracking system 54 is used to keep the driver from falling asleep, watching that the driver's possessions such as keys are not left in the car, remind the driver to remove groceries, etc.

Driver profile database 56 can be included as part of the physical components of CPU 30 or can be accessed remote via network 62. Driver profiles database 56 includes information for all possible drivers of vehicle 12. A driver profile may include information needed to identify a driver, such as a particular speech pattern, visual recognition data, etc along with potential debilitating conditions the driver may have, a listing of favorite places frequented by the driver etc. It is contemplated that a driver profile can also be created automatically by CPU 30 after observing a new driver and asking a series of questions designed to populate driver profile in driver profile database 56. Identifier 58 works in conjunction with driver profiles database 56 and the sensor data to identify a driver, allowing monitoring of the driver to be custom tailored to his or limitations.

Figure 4:
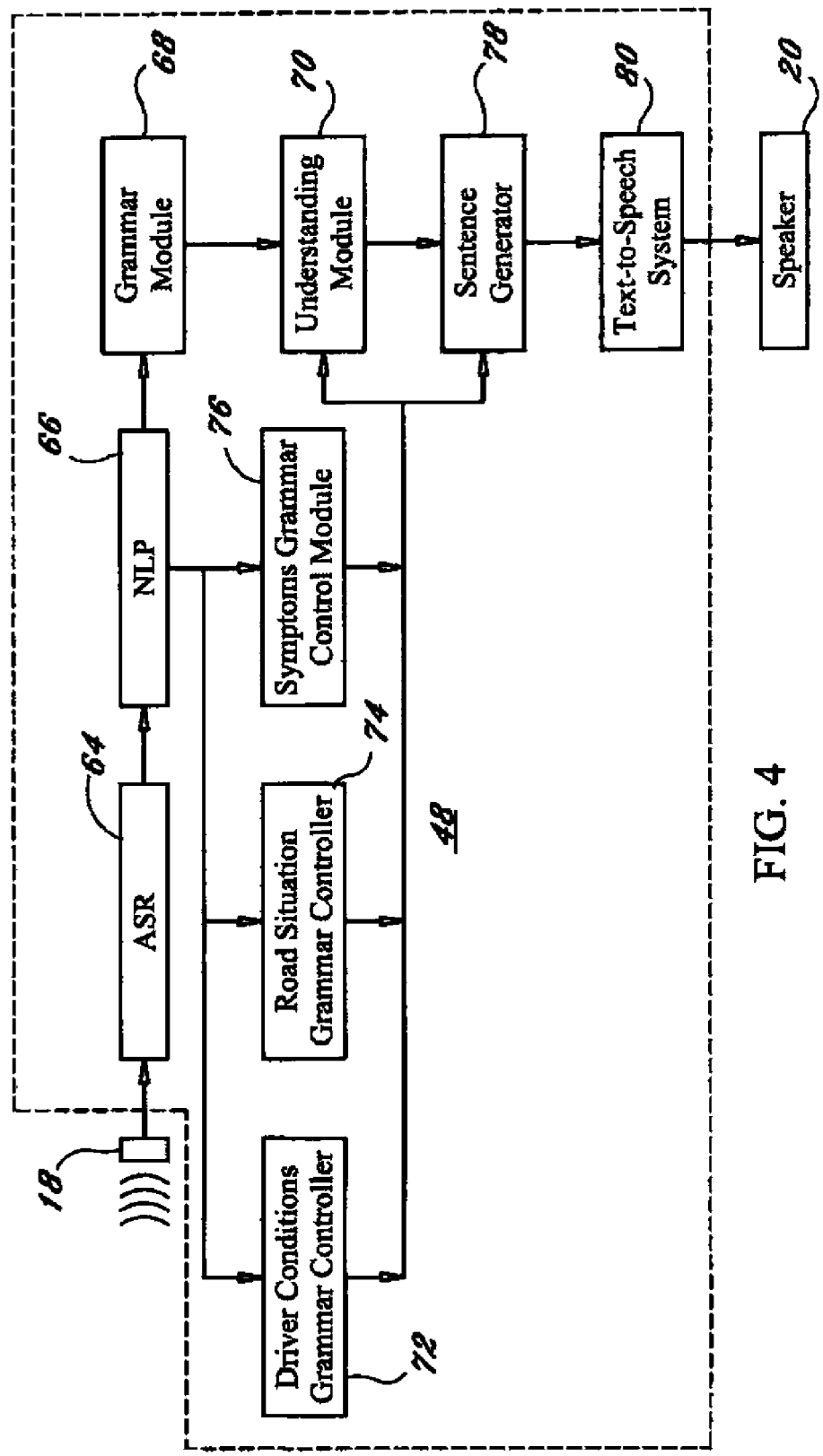
FIG. 4 is a block diagram of a conversation planner constructed in accordance with the principles of the present invention.

Conversation planner 48 is described in detail with reference to FIG. 4. Conversational planner 48 includes automatic speech recognizer ("ASR") 64, natural language processor 66, grammar module 68, understanding module 70, driver conditions grammar control module 72, road situation grammar control module 74, symptoms control module 76, sentence generator 78 and text-to-speech ("TTS") system 80. In operation, ASR 64 receives speech via one or more microphones 18 and passes the recognized text to natural language processor 66. Devices for performing automatic speech recognition and natural language processing are known in the art and are not described herein.

Data from natural processor 66 is input to grammar module 68 which processes the natural language data to convert it into a grammar format which can be understood and further interpreted. Understanding module 70 functions as a core of conversation planner 48, acting as an artificial person to understand and determine the speech input via microphone 18 as well as determine condition of the driver based on the driver's verbal input and responses to verbal inquiries and commands.

NLP 66 also feeds natural language data to grammar controller modules 72, 74 and 76. Grammar controller modules 72, 74 and 74 are used to generate data corresponding to driving performance such as specific driver conditions, road situations and symptoms displayed by the driver. This data is provided to understanding module 70 such that understanding module 70 can choose a condition hypothesis that best applies to the driver's current condition based on the driver's responses, observed road situation, driver's symptoms, and other driver conditions. For example, if the driver suffers from depression, understanding module 70 may recognize the onset of a bad episode based on what a driver is saying, his or her facial expression, how much attention is being paid to the driving itself. If CPU 30 has a record that the driver has a history of depression, then negative answers to questions as well as additional symptoms that accompany depression such as fatigue, lack of interest, frustration, lack of confidence, etc. will trigger a hypothesis determination by understanding module 70 that the driver is experiencing an episode brought on by depression and may not have taken the required medication. Explanation of how other elements of system 10 function with understanding module 70 are described below.

Sentence generator 78 generates data corresponding to speech to be played to the driver TTS system 80 converts the sentence data created by sentence generators 78 to speech for playback on speaker 20. TTS systems are known in the art and are not described herein.

Symptoms grammar control module 76, understanding module 70 and sentence generator 78 are described in additional detail. Symptoms grammar control module 76 relates symptoms to its own grammar. As used herein, the word "relate" means that symptoms grammar control module 76 determines correspondence between driver conditions based on responses to a collection of phrases and specifies a domain. For every symptom or condition, or an associated collection of phrases there are grammar constraints which include a constraint domain of acceptable responses, vocabulary corresponding to the constraint domain and associated phrases and questions used by understanding module 70 and sentence generator 78.

For, example, a phrase may be "Did You Remember [blank]?" In this case the "blank" may represent one or more of "the exit", "to look at the stop sign", "to stop at the red light", "to turn right", "to turn left", "to take your medication", etc. The data corresponding to the "blank" is used by sentence generator 78. When a phrase is generated, a series of expected possible answers are also generated. This is an example of a domain of grammatical constraints fed into grammar module 68 as acceptable responses to the inquiry. For example, an expected constraint answer for a particular question may be "yes", "no", "oh", "I forgot" or "what", etc. In operation, the response interpreted by NLP 66 is compared with the expected answers and if there is a match between the two, conversation planner 48 presumes that received answer was the intended answer. If there is not a match, this may signal a symptom of an illness that the driver may be experiencing. The comparison of the expected or predicted answer with the real transcribed answer is preferably performed by understanding module 70. Similar processing occurs with road situation grammar control module 74 and driver conditions grammar control module 72.

Figure 5:
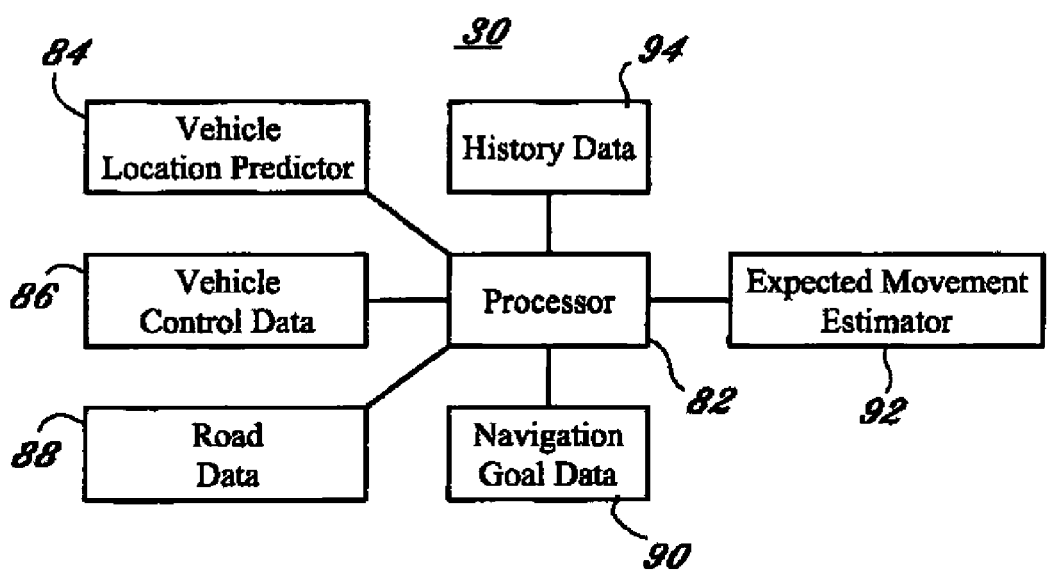
FIG. 5 is a block diagram of tremor normalizers constructed in accordance with the principles of the present invention.

Pedal tremor normalizer 26 and wheel tremor normalizer 28 are explained with reference to FIG. 5. FIG. 5 shows a block diagram of normalizers 26 and 28. Normalizers 26 and 28 include processor 82 which interacts with vehicle location predictor 84, vehicle control data 86, road data 88, navigation goal data 90 and expected movement estimator 92. Vehicle location predictor 84 predicts the position of vehicle 12. It is known how to accurately predict the general position of a vehicle based upon its control instrumentation as vehicle 12 travels down a road. For example, if a vehicle is going straight and there are no streets to turn in to, the chance that a driver wilt make a sharp turn are very small. Therefore, vehicle location predictor 84 would predict that the vehicle will continue to go straight. Vehicle control data 88 are data picked up by various sensors within the vehicle in places like the steering wheel, pedal, mirrors, and video captured by camera 22. Vehicle location predictor 84 may, for example feel a sudden motion by the driver's hand when he or she lets got to adjust the rearview mirror or change the radio station.

Expected movement estimator 92 estimates the amount of expected human movement based on the predicted movements of the vehicle. For example, if the vehicle is expected to be going straight, then the hand is expected not to move much to turn the steering wheel. As another example, if the car is nearing a turn, and data from navigation goal data 90 indicates that the car must turn right to get to a predetermined destination, then expected movement estimator 22 knows that a right turn should be expected, even if the vehicle location predictor 84 does not have this information. Vehicle location predicator 84 therefore optimally works for short distance expectations, while expected movement estimator 92 operates for both long and short distances.

Expected movement estimator 92 also receives, via processor 82, vehicle control data 86 and road data 88 and history data 94. History data 94 includes information about the driver's past trips, frequency of onset of various conditions such as tremors, seizures, etc. how strong the tremors are, how often the driver forgets to take his or her medication, etc. Based on history data 94 normalizers 26 and 28 can determine whether the driver is experiencing a tremor or whether they are generally turning the steering wheel. Normalizers 26 and 28 therefore analyze the situation on the road using road data 88 to ensure that actions taken by the driver do not have the potential for an accident. For example, wheel tremor normalizer 28 may determine that the movement is a tremor, and if so, it does not allow the steering wheel to be turned sharply to prevent an accident. Similarly, pedal tremor normalizer 26, separately or in conjunction with wheel tremor normalizer 28, may slow the car down, depending on surrounding conditions, to allow the operator to recover. In other words, normalizers 26 and 28 can determine that the driver input is not an expected and normal input based on the surrounding conditions and can attenuate the actual input by the driver relative to the level of intent for the turn or acceleration.

The overall operation of the invention is described with reference to the flow chart in FIG. 6. Initially, the driver is identified using one or more of the components described above (step S100). The driver profile for the identified driver is retrieved (step S102) and a determination made based on the profile whether driver supervision is required (step S104). Supervision may be required if the driver has a potentially debilitating condition as identified by the driver's profile in driver profile database 56.

If no supervision is required, the system resorts to its default monitoring condition (step S106). Such default monitoring may be the acquisition of data, the use of the GPS-based navigation system or other aspects of system 10 which provide benefit to driving for those without potentially debilitating conditions. If supervision is required (step S104), driver supervision data is retrieved (step S108) from driver profile database 56 or other local or remote database.

Once the driver supervision data has been retrieved, CPU 30 determines whether to verify road signs (step S110), verify that the driver is paying attention to vehicle operation (step S112), check for tremors (step S114) and/or whether the driver requires monitoring to the destination point such as may be the case were the driver needs to be prompted to follow directions to the destination (step S116). Of note although steps S110-S116 are shown sequentially, it is understood that no particular order is intended and FIG. 6 shows steps S110-S116 sequentially for purposes of convenience only.

There are two generally classes of instructions that apply two general types of illness that a person may have, psychological/mental versus physical handicaps. The most typical monitoring requirement is to observe where the driver is going and to assist by reminding the driver where to turn, where to stop, etc. If the driver supervision data indicates that the driver should be prompted to check, and verify road signs in step S110, system 10 provides road sign attention request to the driver in the form of verbal instructions. For example, the drive may be prompted to pay to attention to significant road signs such as street signs, stop signs, traffic lights, etc.

If the driver supervision data indicates that the driver's attention must be verified (step S112), the verification period is determined (step S120) and inquiries are made by system 10 to verify that the driver is paying attention during each verification period (step S122).

The verification period of step S120 can vary depending on the amount of mistakes that the driver has previously made while driving or is making while driving to the destination. For example, a driver who has begun missing turns with increasing frequency may be prompted to verify his or her attention with increasing frequency. Attention can be verified by making periodic inquires of the driver and analyzing responses thereto.

If the driver is to be checked for tremors (step S114), CPU 30 activates tremor control (step S124) via pedal tremor normalizer 26 and wheel tremor normalizer 28.

Where the driver supervision data (step S108) indicates that the driver is to be monitored to his or her destination (step S116), the destination is determined (step S126), for example by asking the driver, or receiving input via keyboard, touch pad, etc. CPU 30 determines the route to the destination (step S128) and a series of driver instructions are generated (step S130). The most typical monitoring requirement will be to monitor where the driver is going and assist the driver by reminding where to turn, whereto stop, etc. CPU 30 monitors the driver's progress to update route information and generate new driver instructions, as needed.

Figure 6:
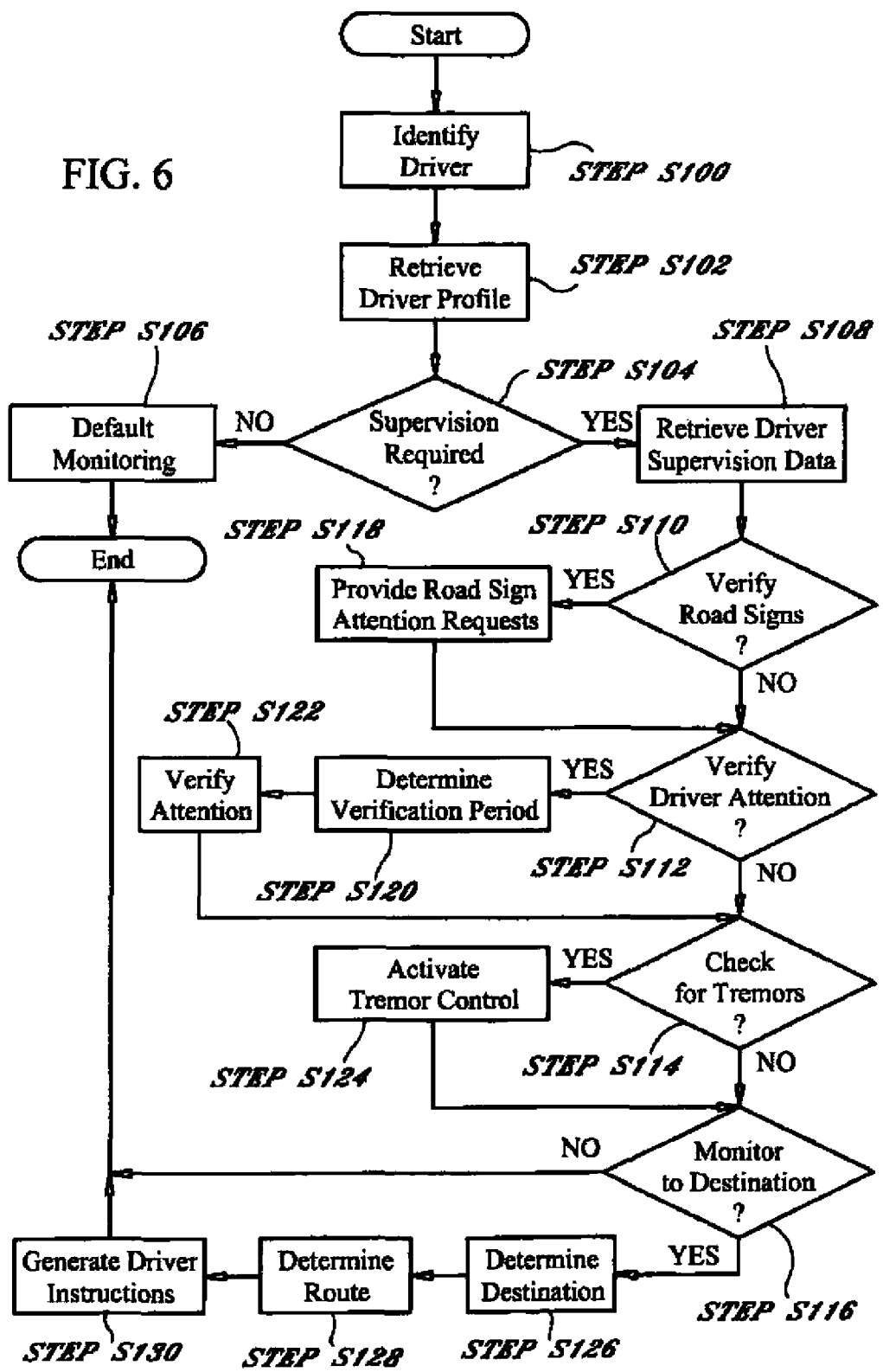
FIG. 6 is a flow chart of the operation of the present invention.

Of note, the verification and monitoring steps shown in FIG. 6 are merely exemplary. It is contemplated that a more complicated system can be arranged which accounts for a comprehensive set of illnesses so that additional types of verification can be implemented, as needed. For example, a system which includes provisions for support of drivers having diabetes may also verify blood sugar levels via biometric technology. Advantageously, system 10 monitors the physical condition of a driver to note any symptoms of illness or onset of a debilitating condition.

Figure 7:
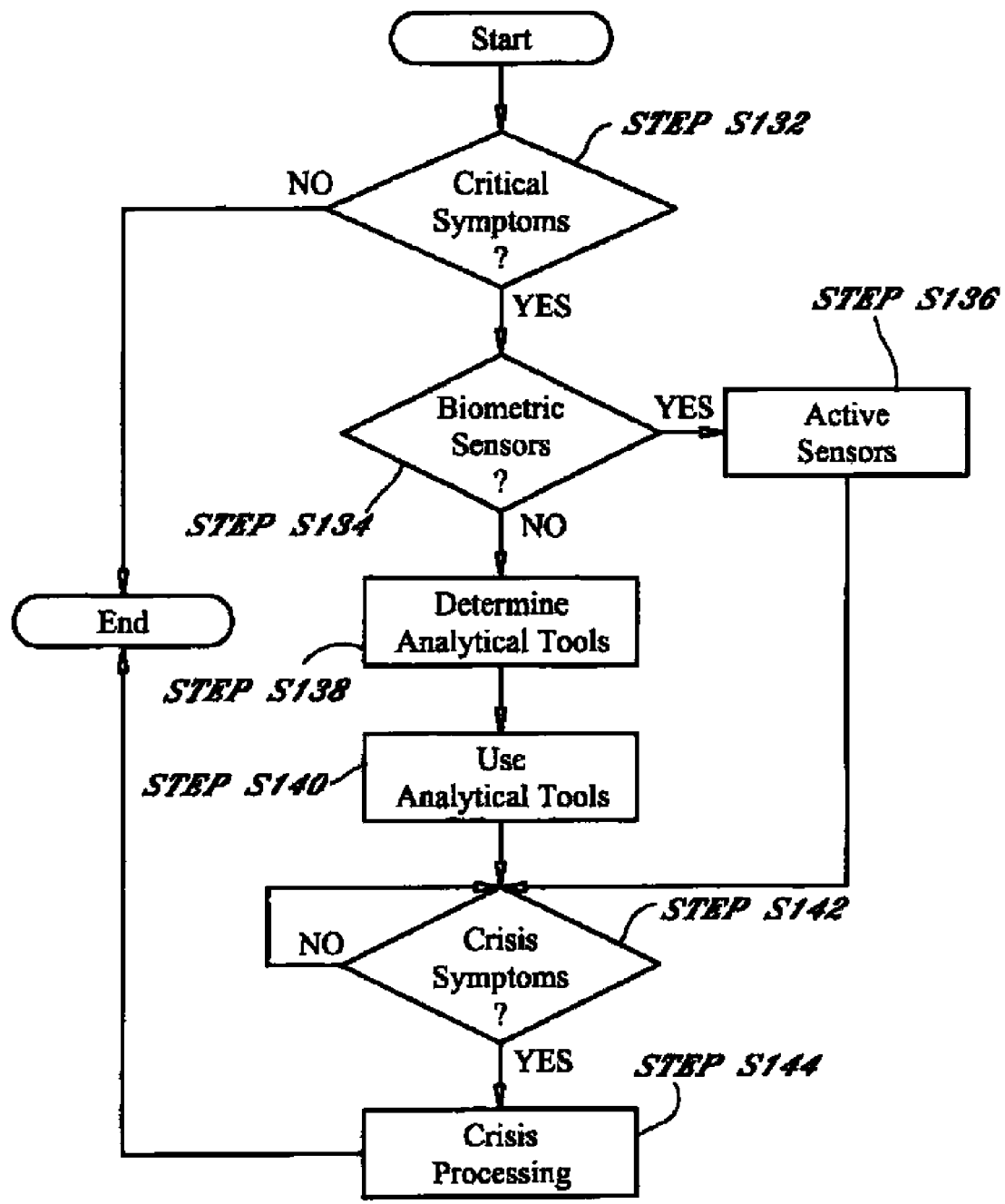
FIG. 7 is a flow chart of an exemplary operation using the present invention.

An example of the operation of system 10 is described with reference to FIG. 7 for a driver that is experiencing symptoms that may result in a crisis. For example, such a symptom may be that of a diabetic having a diabetic reaction and who begins to lose consciousness or have a dizzy spell, while a person with depression may begin to lose concentration and have negative thoughts and resulting in extreme carelessness while driving. Initially, a determination is made as to whether the driver is experiencing symptoms that may cause a crisis (step S132). Symptoms can be retrieved, for example, from incompetence system database 60 by communication module 46. If biometric sensors are available as part of system 10 which can be used to aid such a determination, the sensors are activated to recover biometric data there from (step S136). If biometric sensors are not available, a determination is made as to whether there are any analytical tools which can be used to detect whether the critical symptoms have manifest to the point of crisis (step S138).

For example, a diabetic may be assisted by a sensor that reads their blood sugar level or electronic signals from the body. Analytical tools may include generating and conducting a conversation via conversation planner 48 to inquire about condition, using camera 24 to identify particular facial patterns or gestures, etc.

If analytical tools are determined to exist, the analytical tools are used (step S140). The system starts recognition via questioning and monitors the driver's answers and the tone of voice to verify whether any answers may point to whether crisis symptoms are exhibited. If, via the activated sensor and/or the analytical tools crisis symptoms are being experienced by the driver (step 142), the system performs crisis processing (step S144). Crisis processing includes taking those steps necessary to ensure the safety of the driver, vehicle 12, other vehicles 40 and/or other drivers 42. As such, by way of example, crisis processing (step S144) may include stopping vehicle 12, alerting the driver, alerting relatives and authorities, etc.

The present invention advantageously provides a system and method by which potentially debilitating conditions can be monitored to facilitate the safe operation of a vehicle. The system of the present invention can make use of biometric sensor data obtained externally from the driver or from sensors included as part of implanted devices. The present invention provides a comprehensive mechanism for assisting the driver with the operation of the vehicle through an interactive process which can provide direction to the driver, minimize the impact of tremors during the operation of the vehicle verifying that the driver is paying attention and observing signs, and the like.

The present invention makes use of a comprehensive symptom database which can be used to facilitate interaction with the driver to determine whether the driver is exhibiting symptoms corresponding to a potentially debilitating condition. Because system 10 includes a comprehensive sub-system for evaluating various potentially debilitating medical conditions, it is contemplated that system 10 also be used to aid the diagnosis of illnesses such as diabetes or depression through the monitoring of the drivers driving patterns and moods. It is also contemplated that data derived from drivers that require assistance can be used to improve assistance to other drivers by improving profiles of individual drivers and/or by improving the base of knowledge used to populate incompetence symptoms database 60.

The present invention provides drivers with attention deficit disorders and drivers whose driving can be affected by critical health conditions (diabetes, depression, epilepsy, etc.) with the information and controls necessary to participate as driving members of society. This is accomplished, at least in part, through the provision of an observational system that identifies whether driver has critical medical conditions and monitors his or her ability to safely drive a car by tracking driving performance and/or by expected responses to dialogue.

As noted above, the present invention can be realized in hardware, software, or a combination of hardware and software. A typical combination of hardware and software could include a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language code or notation, of a set of instructions intended to cause a system having an information processing capability to perform a particular function either directly or after either or both of the following a) conversion to another language, code or notation; b); reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A vehicle control system for facilitating operation of a vehicle by a driver with a potentially debilitating condition, comprising:
   at least one sensor providing sensor data for at least one of a vehicle condition or a driver condition;
   a database including potentially debilitating condition data and symptoms data corresponding thereto; and
   a central processing unit in data communication with the database and the at least one sensor, the central processing unit monitoring the operation of the vehicle by the driver based on the sensor data and the database.

2. The vehicle control system according to claim 1, wherein the monitoring includes detecting the existence of a medical crisis.

3. The vehicle control system according to claim 2, wherein the central processing unit operates to control operation of the vehicle in response to the existence of a medical crisis.

4. The vehicle control system according to claim 2, wherein the central processing unit operates to initiate a warning to at least one of other vehicles and other drivers in response to the existence of a medical crisis.

5. The vehicle control system according to claim 2, further including an implant device implanted in the driver, the implant device in communication with the central processing unit, the implant device being used to determine the existence of a crisis.

6. The vehicle control system according to claim 1 wherein the central processing unit includes an internal observer, the internal observer monitoring the driver to make a determination of whether the driver is experiencing a condition which adversely effects the driver's ability to operate the vehicle.

7. The vehicle control system according to claim 1, wherein the central processing unit includes a conversation planner, the conversation planner engaging in conversation with the driver and evaluate the condition of the driver.

8. A method for facilitating operation of a vehicle by a driver with a potentially debilitating condition, comprising:
   receiving data from a sensor, the sensor monitoring at least one of a vehicle condition or a driver condition;
   storing potentially debilitating condition data and symptoms data corresponding thereto in a database; and
   monitoring the operation of the vehicle by the driver based on the sensor data, the debilitating condition data and the symptoms data.

9. The vehicle operation facilitation method according to claim 8, wherein monitoring includes detecting the existence of a medical crisis.

10. The vehicle operation facilitation method according to claim 9, further comprising using a central processing unit to control operation of the vehicle in response to the existence of a medical crisis.

11. The vehicle operation facilitation method according to claim 9, further comprising providing a warning to at least one of other vehicles and other drivers in response to the existence of a medical crisis.

12. The vehicle operation facilitation method according to claim 9, further comprising using a device implanted in the driver to determine the existence of a crisis.

13. The vehicle operation facilitation method according to claim 8, wherein monitoring includes determining whether the driver is experiencing a condition which adversely effects the driver's ability to operate the vehicle.

14. The vehicle operation facilitation method according to claim 8, wherein monitoring includes engaging in conversation with the driver and evaluating the condition of the driver based on the conversation.

* * * * *